(12) United States Patent  
Goldstein et al.

(10) Patent No.: US 9,094,317 B2  
(45) Date of Patent: Jul. 28, 2015

(54) PROCESSOR TOPOLOGY SWITCHES

(75) Inventors: Martin Goldstein, Campbell, CA (US); Kamran H. Casim, Rocklin, CA (US); Loren M. Koehler, Fair Oaks, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 803 days.

(21) Appl. No.: 13/258,903

(22) PCT Filed: Jun. 18, 2009

(86) PCT No.: PCT/US2009/047864
§ 371 (c)(1), (2), (4) Date: Sep. 22, 2011

(87) PCT Pub. No.: WO2010/147590
PCT Pub. Date: Dec. 23, 2010

(65) Prior Publication Data
US 2012/0014390 A1    Jan. 19, 2012

(51) Int. Cl.
| | |
|---|---|
| *H04L 12/28* | (2006.01) |
| *H04L 12/50* | (2006.01) |
| *G06F 13/40* | (2006.01) |
| *H04L 12/24* | (2006.01) |
| *H04L 12/40* | (2006.01) |
| *H04B 10/80* | (2013.01) |
| *H04L 12/751* | (2013.01) |
| *H04L 12/937* | (2013.01) |

(52) U.S. Cl.
CPC ............ *H04L 41/12* (2013.01); *G06F 13/4022* (2013.01); *G06F 13/4068* (2013.01); *H04B 10/801* (2013.01); *H04L 12/40006* (2013.01); *H04L 12/40169* (2013.01); *H04L 12/50* (2013.01); *H04L 45/02* (2013.01); *H04L 49/253* (2013.01)

(58) Field of Classification Search
CPC .................. H04L 12/40006; H04L 12/40169; H04L 12/50; H04L 41/12; H04L 45/02; H04L 49/253; G06F 13/4022; G06F 13/4068
USPC .......................................................... 710/316
See application file for complete search history.

(56) References Cited

U.S. PATENT DOCUMENTS

| | | | |
|---|---|---|---|
| 5,251,299 A | 10/1993 | Masuda et al. | |
| 5,339,396 A | 8/1994 | Muramatsu | |
| 5,850,395 A | 12/1998 | Hauser | |
| 5,903,771 A * | 5/1999 | Sgro et al. | ........................ 712/20 |
| 6,092,136 A * | 7/2000 | Luedtke | ........................ 710/107 |
| 6,243,361 B1 | 6/2001 | McMillen | |

(Continued)

FOREIGN PATENT DOCUMENTS

| | | |
|---|---|---|
| CN | 1316145 | 10/2001 |
| CN | 101006433 | 7/2007 |

(Continued)

OTHER PUBLICATIONS

Internaitonal Search Report, PCT/US2009/047864, Mar. 17, 2011 7 pages.

*Primary Examiner* — Ryan Stiglic
(74) *Attorney, Agent, or Firm* — Clifton L. Anderson

(57) ABSTRACT

A first processor has a processor port for peer-to-peer processor communications. A switch provides for switching communications from a path between said first processor and a second processor to a path between said first processor and a third processor (and vice-versa).

17 Claims, 6 Drawing Sheets

(56) References Cited

U.S. PATENT DOCUMENTS

| | | | |
|---|---|---|---|
| 6,370,585 B1 * | 4/2002 | Hagersten et al. | 709/238 |
| 6,415,424 B1 | 7/2002 | Arimilli | |
| 6,426,957 B1 | 7/2002 | Hauser | |
| 6,996,504 B2 * | 2/2006 | Novotny et al. | 703/1 |
| 7,281,055 B2 * | 10/2007 | Glasco et al. | 709/232 |
| 7,436,824 B2 * | 10/2008 | Pepenella | 370/386 |
| 7,865,655 B2 * | 1/2011 | Li et al. | 710/316 |
| 2004/0022022 A1 * | 2/2004 | Voge | 361/684 |
| 2004/0236891 A1 * | 11/2004 | Arimilli et al. | 710/306 |
| 2005/0235092 A1 | 10/2005 | Ballew et al. | |
| 2006/0143357 A1 * | 6/2006 | Shaw et al. | 710/317 |
| 2006/0161718 A1 * | 7/2006 | Berke et al. | 710/317 |
| 2007/0079046 A1 * | 4/2007 | Yang et al. | 710/316 |
| 2008/0055938 A1 | 3/2008 | Kajouke | |
| 2008/0114918 A1 * | 5/2008 | Bingi et al. | 710/300 |
| 2008/0184259 A1 * | 7/2008 | Lesartre et al. | 719/312 |
| 2008/0250181 A1 * | 10/2008 | Li et al. | 710/302 |

FOREIGN PATENT DOCUMENTS

| | | |
|---|---|---|
| CN | 101309300 | 11/2008 |
| EP | 0345738 A2 | 12/1989 |

* cited by examiner

PROCESSOR TOPOLOGY SWITCHES

BACKGROUND

Herein, related art is described for expository purposes. Related art labeled "prior art", if any, is admitted prior art; related art not labeled "prior art" is not admitted prior art.

Blades are, typically thin, modules that can be installed in a blade enclosure. Each blade can function as a server, so a blade system can provide multiple servers in a compact enclosure. Some blade systems provide for conjoining blades to define multi-blade servers that provide more computing power than can be provided by a single blade. For two or more blades to function as one, high-speed communications are required between the blades.

Some blade systems provide high-speed "jumpers" that provide for high-speed inter-blade processor-to-processor communications. By manually replacing jumpers, the conjoining of blades can be changed. Other blade systems have blade enclosures that provide for automated control of inter-blade routings so that conjoining arrangements can be changed without manually changing jumpers or other components.

DETAILED DESCRIPTION

In many multi-processor systems, processors can communicate with each other through a system bus. Beyond this, some processors have ports designed for faster point-to-point communications between pairs of processors. The present invention provides for coupling a switch to such a processor port so that the processor that port communicates with can be selected. In the context of blade and other systems, such switches can provide for economical automated switching between processor communications topologies, e.g., between an 8-processor parallel topology and a dual 4-processor topology.

Figure 1:
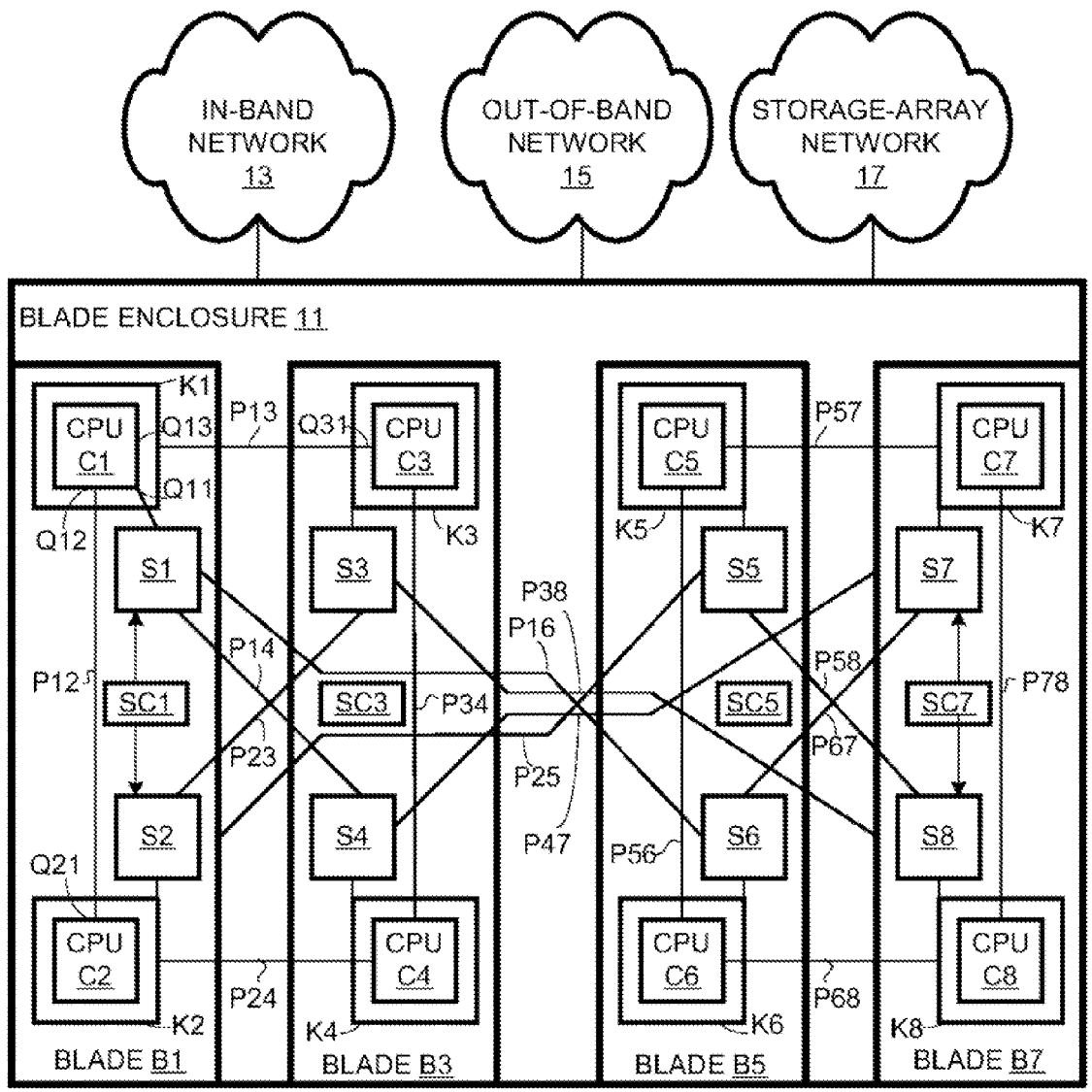
FIG. 1 is a schematic diagram of a blade system in accordance with an embodiment.

Accordingly, a system AP1 includes a blade enclosure 11 connected to several networks including an in-band network 13, out-of-band network 15, and a storage-array, network 17, as shown in FIG. 1. Blade enclosure 11 can hold up to sixteen blades, four of which B1-B4 are shown. Each blade includes two processors, two sockets, two switches, a switch controller, and all or portions of point-to-point inter-processor communication pathways as indicated in the following Table I.

TABLE I

| | Blade components | | | |
|---|---|---|---|---|
| | Blade 1 | Blade 3 | Blade 5 | Blade 7 |
| Processors | C1, C2 | C3, C4 | C5, C6 | C7, C8 |
| Sockets | K1, K2 | K3, K4 | K5, K6 | K7, K8 |
| Switches | S1, S2 | S3, S4 | S5, S6 | S7, S8 |
| Switch controllers | SC1 | SC3 | SC5 | SC7 |
| Complete pathways | P12 | P34 | P56 | P78 |
| Portions of pathways | P13, P14, P16, P24, P23, P25 | P13, P23, P38, P14, P24, P47 | P57, P25, P58, P68, P67, P16 | P57, P47, P67, P38, P58, P68 |

Processor (CPU) C1 has three point-to-point processor communication ports Q11, Q12, and Q13. As shown in FIG. 1, processor C1 is arranged so that it can communicate via its port Q12 point-to-point with processor C2 via its port Q21 and intra-blade path P12. Processor C1 can also communicate with its port Q13 via inter-blade communications path P13 with processor C3 via its port Q31. Depending on the configuration of switch S1, processor C1 can communicate with processor C4 or processor C6 through switches and pathways as shown.

The configuration of switch S1 is controlled by switch controller SC1, which also controls switch S2. Switch controller SC1 controls switches S1 and S2 in unison so that processor C1 is communicatively coupled to processor C4 while processor C2 is communicatively coupled to processor C3 and so that processor C1 is communicatively coupled to processor C6 while processor C2 is communicatively coupled to processor C5. At the time represented in FIG. 1, switch S1 is configured so that processor C1 communicates with processor C6 and not with processor C4. Also, at that time, processor C2 is configured to communicate with processor S7 and not with processor S3. Likewise, switch controllers SC3, SC5, and SC7 control respective pairs of switches in unison. In an alternative embodiment, a switch controller controls a blade's switches independently.

Figure 2:
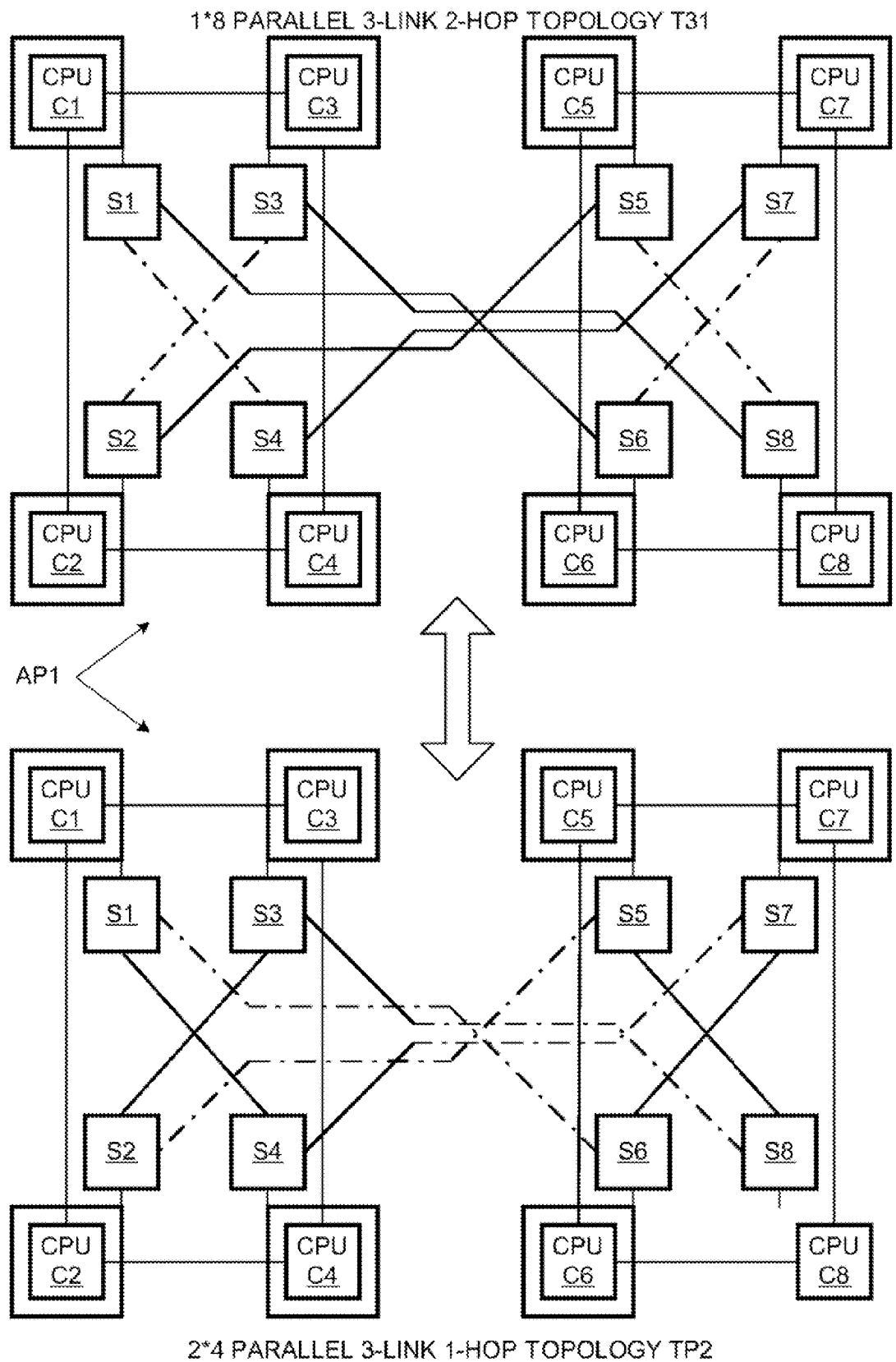
FIG. 2 is a schematic diagram of the blade system of FIG. 1 showing two different topologies it can assume.

While switches SC1, SC3, SC5, and SC7 can be operated independently, in practice they are often controlled in unison to effect a change from one processor topology to another, e.g., to change how blades are conjoined. Which topology is selected depends on whether a single blade mode 21, a dual-blade mode 23, or a quad blade mode 25 is desired. FIG. 2 represents system AP1 before and after switch controllers SC1, SC3, SC5, and SC7 change the configuration of all switches. The upper portion of FIG. 2 corresponds to a 1*8 parallel, 5-link, 2-hop topology TP1. The lower portion of FIG. 2 corresponds to a 2*4, 3-link, 1-hop topology TP2.

Each processor provides for 3 links; for example, processor C1 provides for 3 links via respective ports Q11, Q12, and Q13. All other processors C2-C8 similarly provide three links each. In topology TP1, processor C1 can communicate with some processors (e.g., processors C2, C3, and C6) directly (1-hop), but must communicate with the other processors through one of those three processors. For example, processor C1 must communicate with processor C4 through either processor C2 or processor C3. This is an example of a 2-hop communication. In the case of topology TP1, two hops are the most that are required for any processor to communicate with any other processor. Thus, topology TP1 is a 2-hop topology.

In the case of topology TP2, processors C1-C4 cannot communicate point-to-point with any of processors C5-C8, and vice versa. The eight processors have been split into two sets of four each. Within each set of four, however, all processors can communicate point-to-point without going through other processors. In other words, within sets of four, inter-processor communications involve only one hop. Hence, topology TP2 involves two four-processor sets, with each processor providing for three links, and at most one hop per communicating pair. Topology TP2 has the effect of arranging blades B1, B3, B5, and B7 into two two-blade servers; however, the two-blade servers can also be used separately as one-blade servers.

Figure 3:
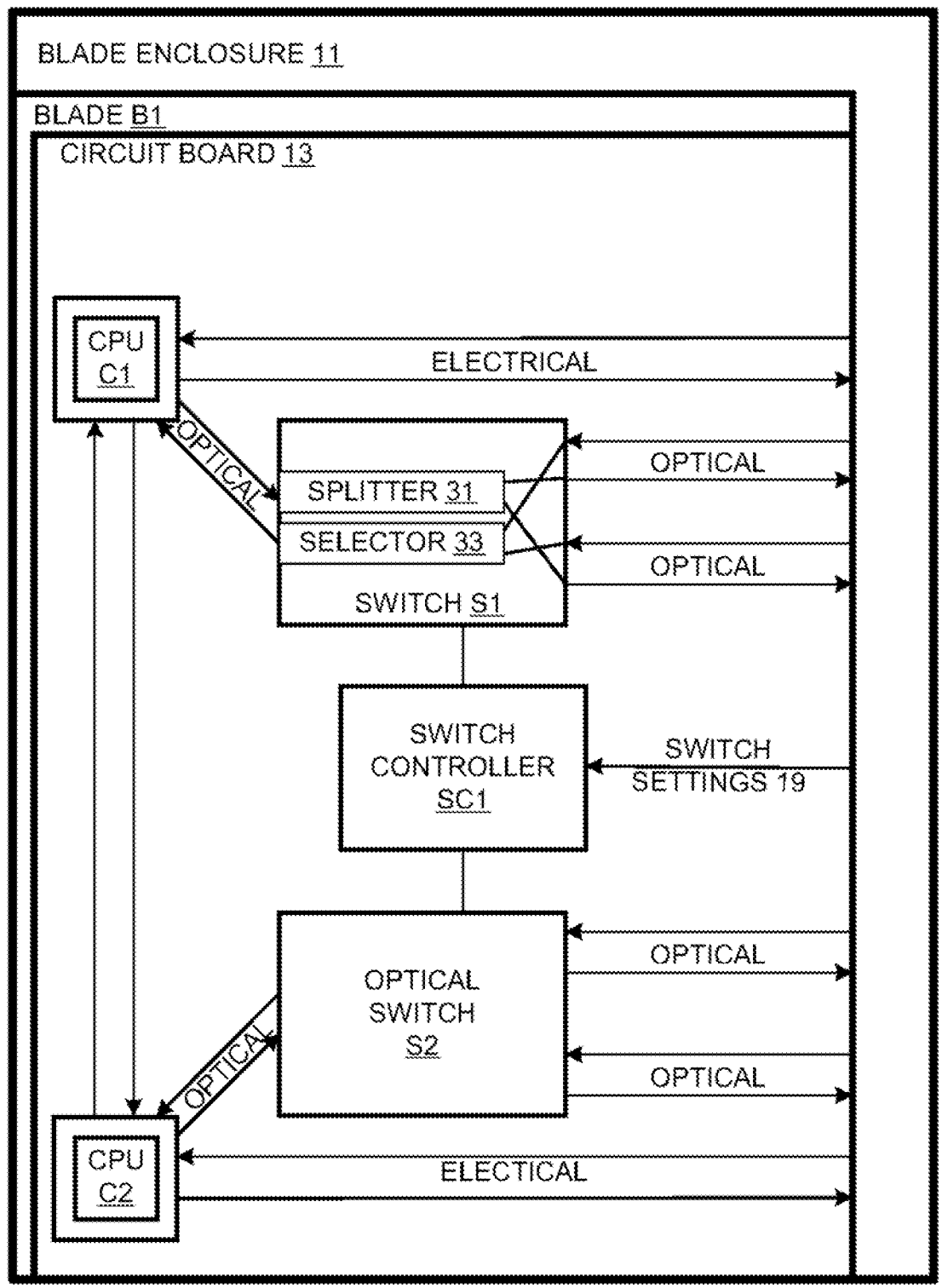
FIG. 3 is a schematic diagram of a blade of the blade system of FIG. 1.

As indicated in FIG. 3 for switch S1, the switches can be optical switches. In that case, port Q11 can be an optical port that can be optically coupled to respective switches S1 and S2. In this case, switch S1 can include a beam splitter 31 for outgoing (from processor C1) data and a beam selector 33 for incoming (to processor C1) data. In this case, each path can include a pair of optical waveguide channels. Likewise, port Q11 uses two optical waveguides for communicating involving switch S1. In an alternative embodiment, incoming and outgoing signals use the same waveguides bi-directionally. Electrical pathways, e.g., P12, P13, and P14 can include pairs of opposing unidirectional channels (as shown in FIG. 3) or a respective bi-directional channels.

As also indicated in FIG. 3, switch controller SC1 receives switch setting data via blade enclosure 11. These settings 19 can be sent over in-band network 13 or an out-of-band network 15 by a management console. The same source would send settings data to switch controllers SC3, SC5, and SC7 for coordinated topology changes.

Figure 4:
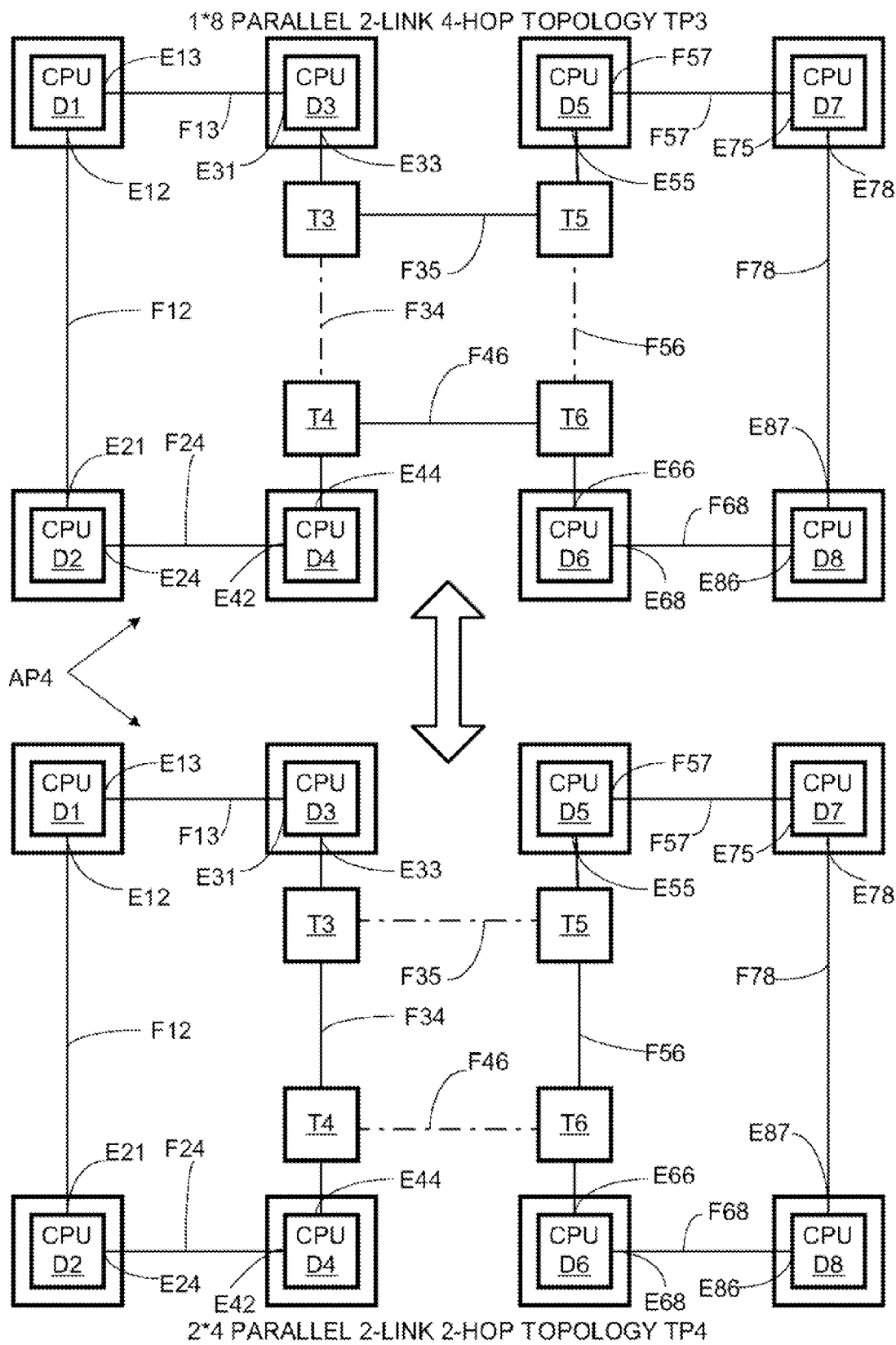
FIG. 4 is a schematic diagram showing two different topology of the invention.

Various embodiments provide for processors with different numbers of links, different port technologies, and different processor communication technologies. For example, in system AP4 of FIG. 4, processors D1-D8 each have two electrical point-to-point communications ports (E12 and E13; E21 and E24; E31 and E33; E42 and E44; E55 and E57; E66 and E68; E75 and E78; and E86 and E87) and no optical point-to-point communications ports. Processors D3-D6 have switches T3-T6 associated with them, while processors D1, D2, D7. and D8 have unswitched ports.

In system AP4, point-to-point communications paths F12, F13, F24, F57, F68, and F78 are unswitched electrical paths. Paths F34, F35, F46, and F56 are switched optical paths. When switches T3-T6 are configured so that paths F35 and F46 are selected and paths F34 and F56 are deselected, system AP4 assumes a 1*8 parallel 2-link, 4-hop topology TP3, as shown in the upper portion of FIG. 4. When switches T3-T6 are configured so that paths F34 and F56 are selected and paths F35 and F46 are deselected, system AP4 assumes a 2*4 parallel, 2-link, 2-hop topology TP4, as shown in the lower portion of FIG. 4.

Figure 5:
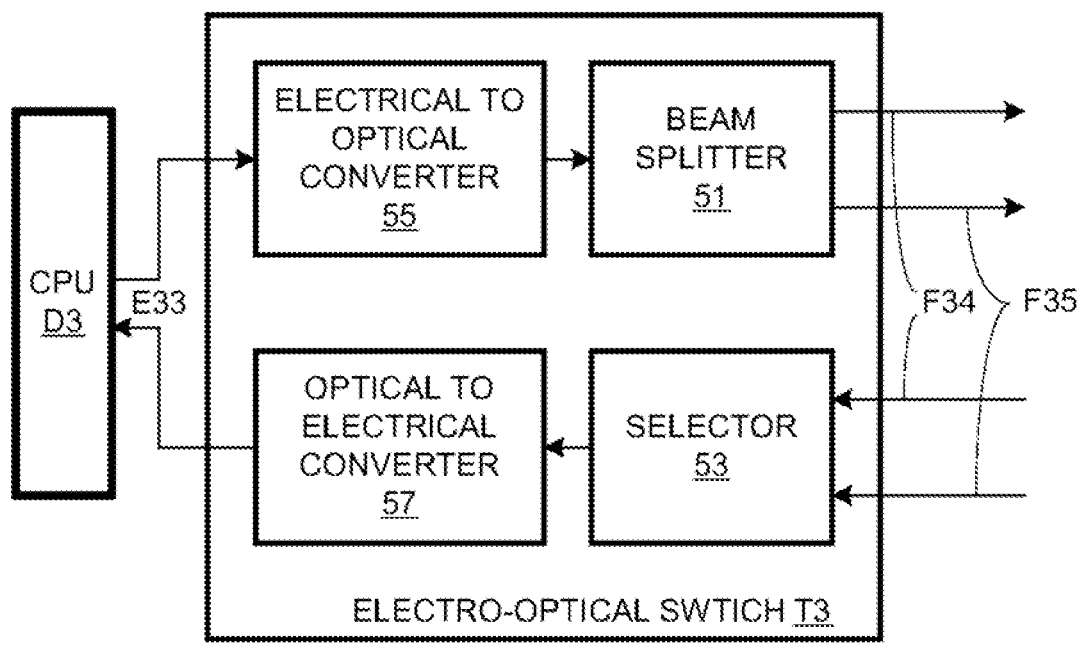
FIG. 5 is a schematic diagram showing a detail of a switch of the system of FIG. 4.

Switches T3-T4 must couple electrical ports to optical paths. Accordingly, electro-optical switches are used. For example, switch T3 is shown in FIG. 5. Switch T3 includes a beam splitter for outgoing optical signals and a selector for incoming optical signals. An electrical-to-optical converter 55 provides an interface between electrical port E33 and beam splitter 51. An optical-to-electrical converter 57 serves as an interface between selector 53 and electrical port E33. Switches T4-T6 are similar to switch T3.

Figure 6:
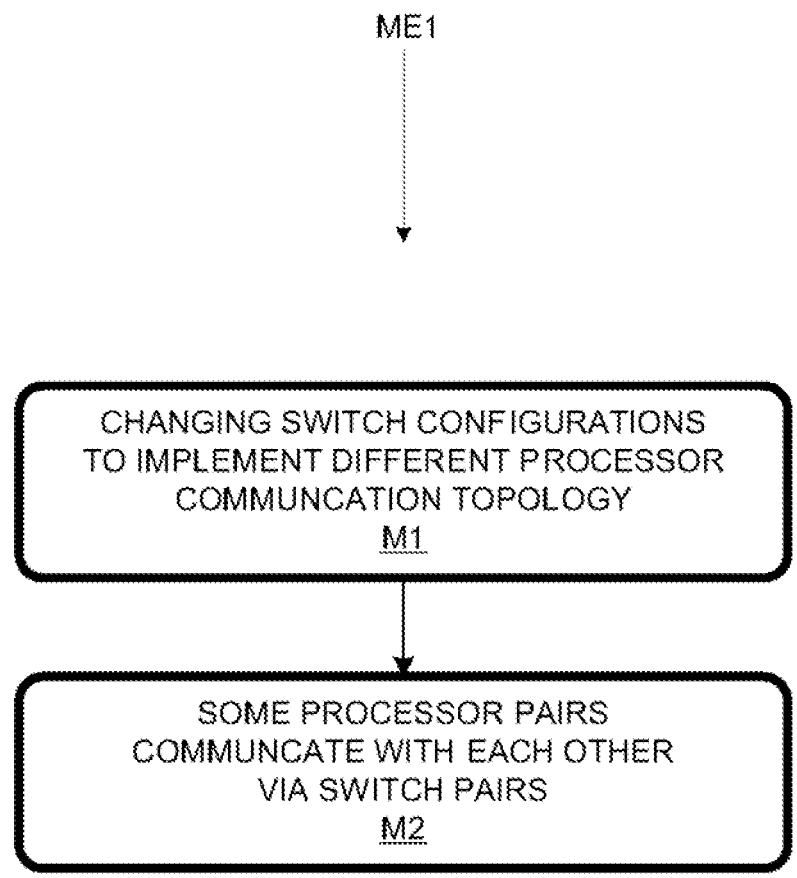
FIG. 6 is a flow chart of a method that can be implemented in the contexts of the systems of FIGS. 1 and 4.

Systems AP1 and AP4 provide for a method ME1 flow-charted in FIG. 6. At method segment M1, switch configurations are set to implement selected processor communications topologies. At method segment M2, at least some processor pairs communicate with each other via switch pairs.

The present invention provides for modular and non-modular computer systems and for modules other than blades. For example, the modules can be rack-mount computers. For another example, the modules can be processor cells, as in the current HP SuperDome 64P, which contains up to 16 4-processor cells. In addition, mixed-type modules are provided for; for example, a system can include full-capability blades (e.g., with processors, disk-storage, and network devices), as well as other blades, modules, or submodules (e.g., than could be inserted in a blade) that contained only processors.

Generally, the invention provides for a variety of module types and configurations with different numbers of processors per module. The total number of processors in a processor communications topology can vary and can be other than a power of two. Larger numbers of processors can provide for more choices in topologies, as can larger numbers of point-to-point processor communications ports or links. The switches can be on the modules or external to the modules. These and other variations upon and modifications to the illustrated embodiment are within the scope of the following claims.

What is claimed is:

1. A method comprising:
    changing switch configurations to change an inter-processor communications topology based on received switch settings switch settings that determine a number of blades to be joined together as a single server in a blade enclosure; and
    communicating between processors peer-to-peer via the changed switches.

2. A method as recited in claim 1 wherein said changing involves configuring a switch coupled to a first processor and selectively coupled to switches coupled to second and third processors respectively.

3. A method as recited in claim 2 wherein said configuring involves switching between a single 8-way parallel processor-communications topology and a dual 4-way parallel processor communications topology.

4. A system comprising:
    a first processor having a first first-processor port for peer-to-peer processor communications; and
    at least a portion of a first-to-second-processor communications path for directing said communication so that they are between said first processor and a second processor;
    at least a portion of a first-to-third-processor communication path for directing said communications so that they are between said first processor and a third processor; and
    a first switch providing for switching said communications from said first-to-second processor communications path to said first-to-third processor communications path and vice versa, the first switch to switch said communications according to received switch settings that determine a number of blades to be joined together as a single server in a blade enclosure.

5. A system as recited in claim 4 wherein said first switch is an optical switch optically coupled to said first port and to said communications paths.

6. A system as recited in claim 4 wherein said first switch is an electro-optical switch, electrically coupled to said first port and optically coupled to said communications paths.

7. A system as recited in claim 4 wherein said communications paths each include one bi-directional channel.

8. A system as recited in claim 4 wherein said communications paths each include an out-going channel and an incoming channel.

9. A system as recited in claim 4 comprising:
at least eight processors including said first, second, and third processors;
at least eight switches coupled to respective ones of said eight processors; and
one or more switch controllers for controlling said switches so as to alternatively arrange said processors in an 8-way parallel two- or three-hop topology and a dual 4-way one-hop topology.

10. A system as recited in claim 4 further comprising a computing module, said module including said first processor, a first switch of said switches, and at least portions of each of said communications paths.

11. A system as recited in claim 10 wherein said module does not include said second processor and does not include said third processor.

12. A system as recited in claim 10 wherein said module includes a fourth processor and a first-to-fourth-processor communications path, said fourth processor having a first fourth-processor port coupled to said first-to-fourth-processor communications path, said first processor including a second first-processor port coupled to said first-to-fourth-processor communications path for peer-to-peer communications between said first and fourth processors.

13. A system as recited in claim 12 wherein said first-to-fourth-processor communications path is electrical and said portions of said first-to-third-processor communications path and said first-to-third-processor communications path are optical.

14. A system as recited in claim 4 further comprising:
a blade enclosure;
at least four blades installed in said enclosure, each of said blades including at least two processors, said first, second, and third processors being in different respective ones of said blades;
processor switches, including said first processor switch, respectively coupled to said processors;
wherein said processor switches can be alternatively configured to define an 8-way parallel processor topology and a dual 4-way parallel processor topology.

15. A system as recited in claim 14 wherein each of said processors has at least three peer-to-peer processor ports, at least one of the three being coupled to one of said processor switches, said 8-way parallel processor topology being a 2-hop or 3-hop topology, said 4-way parallel processor topology being a one-hop topology.

16. A system as recited in claim 15 wherein each of said processors has one optical peer-to-peer port optically coupled to one of said switches and at least two electrical peer-to-peer ports.

17. A system as recited in claim 15 wherein each of said switches is an electro-optical switch electrically coupled to its respective processor and optically coupled to at least two optical communications paths.

* * * * *

UNITED STATES PATENT AND TRADEMARK OFFICE
CERTIFICATE OF CORRECTION

PATENT NO. : 9,094,317 B2  
APPLICATION NO. : 13/258903  
DATED : July 28, 2015  
INVENTOR(S) : Martin Goldstein et al.

Page 1 of 1

It is certified that error appears in the above-identified patent and that said Letters Patent is hereby corrected as shown below:

In the Drawings

In sheet 3 of 6, line 18 approx., delete "ELECTICAL" and insert -- ELECTRICAL --, therefor.

In sheet 6 of 6, line 4 approx., delete "COMMUNCATION" and insert -- COMMUNICATION --, therefor.

In sheet 6 of 6, line 7 approx., delete "COMMUNCATE" and insert -- COMMUNICATE --, therefor.

In the Claims

In column 4, line 26, in Claim 1, delete "switch settings that" and insert -- that --, therefor.

Signed and Sealed this  
Twenty-third Day of February, 2016

Michelle K. Lee  
*Director of the United States Patent and Trademark Office*